Sept. 22, 1959
A. H. LIPPE
2,905,271
AUTOMATIC PRESSURE LUBRICATOR
Filed Sept. 30, 1957
4 Sheets-Sheet 2
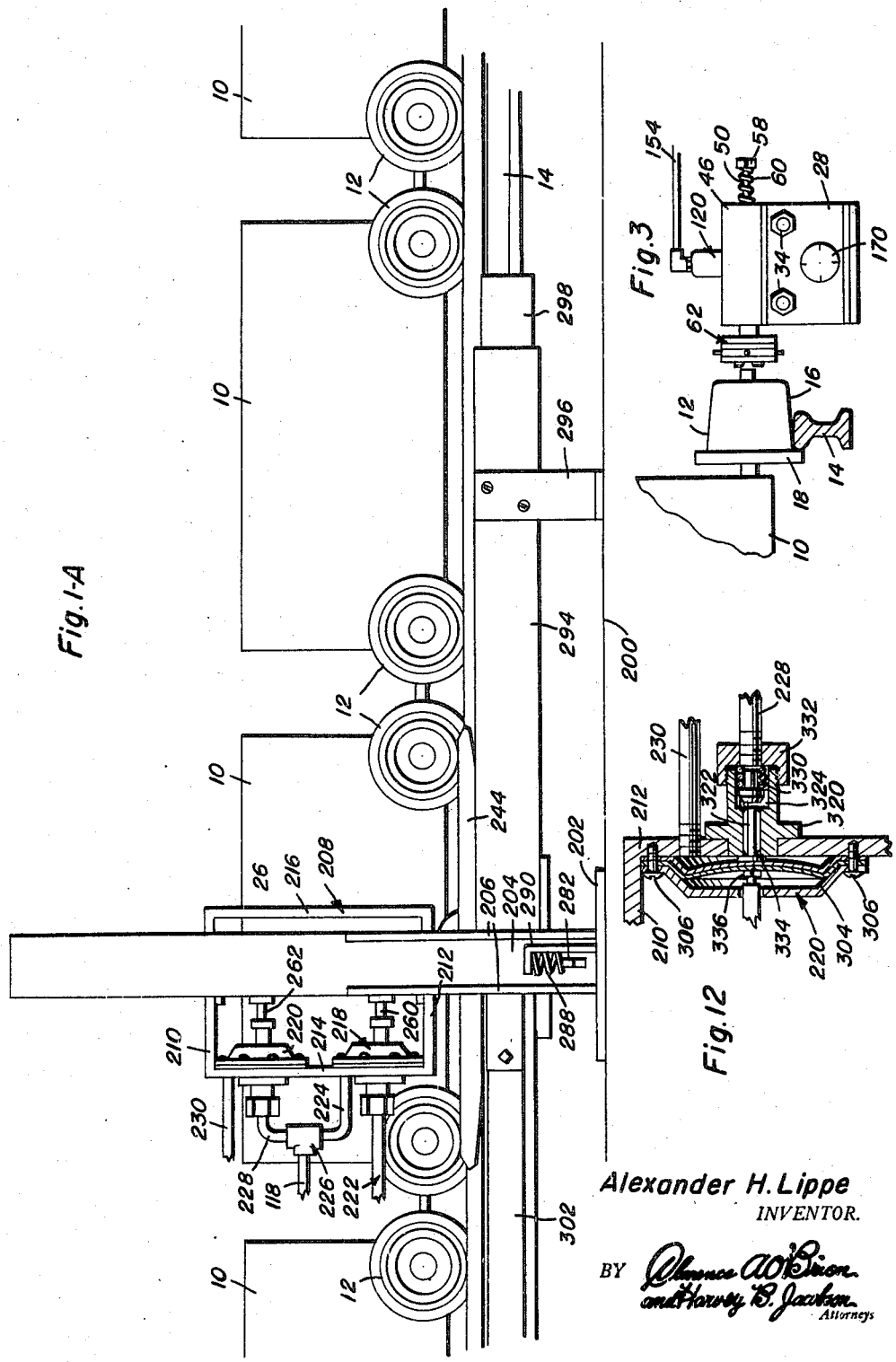
Alexander H. Lippe
INVENTOR.

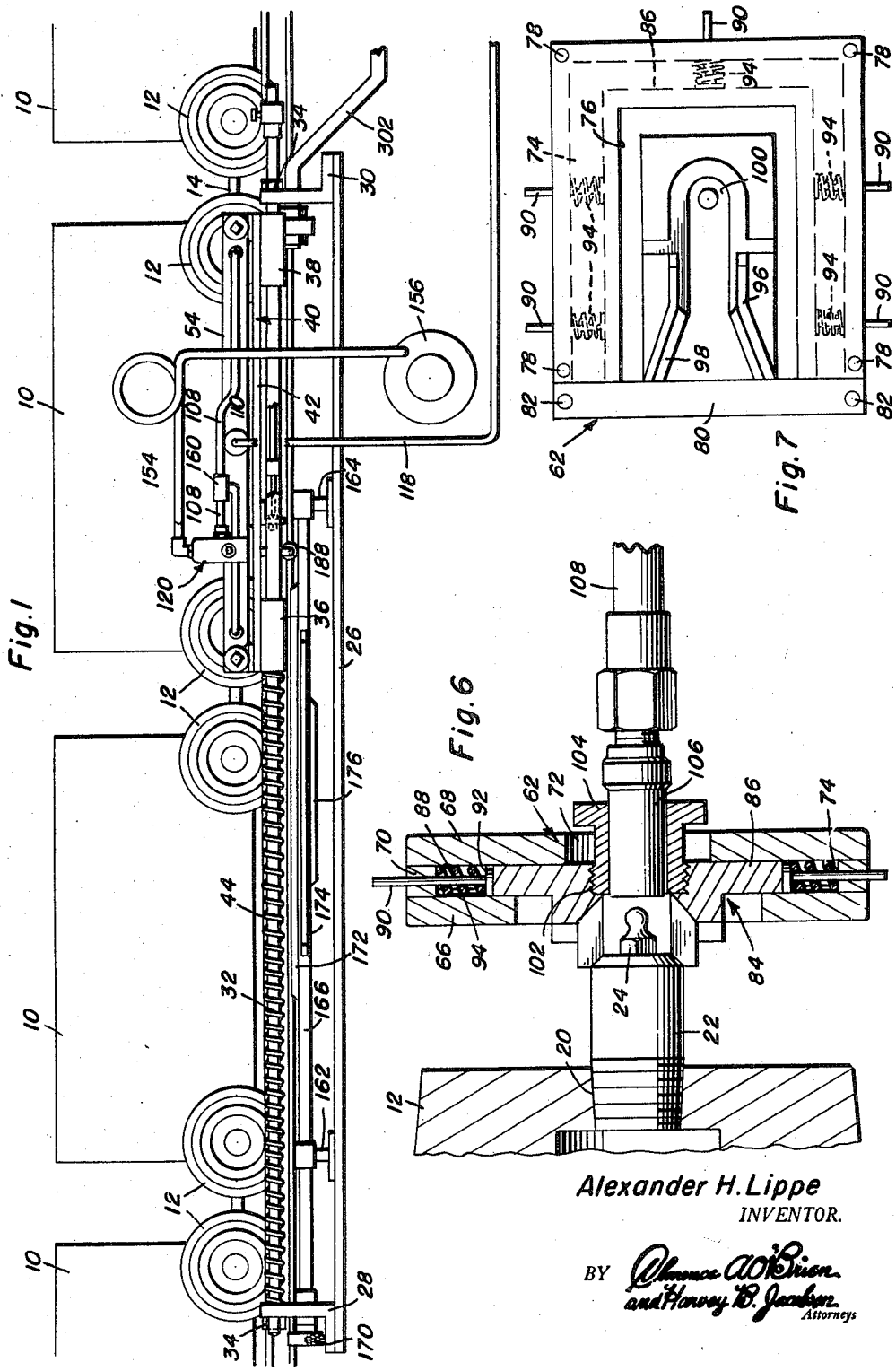

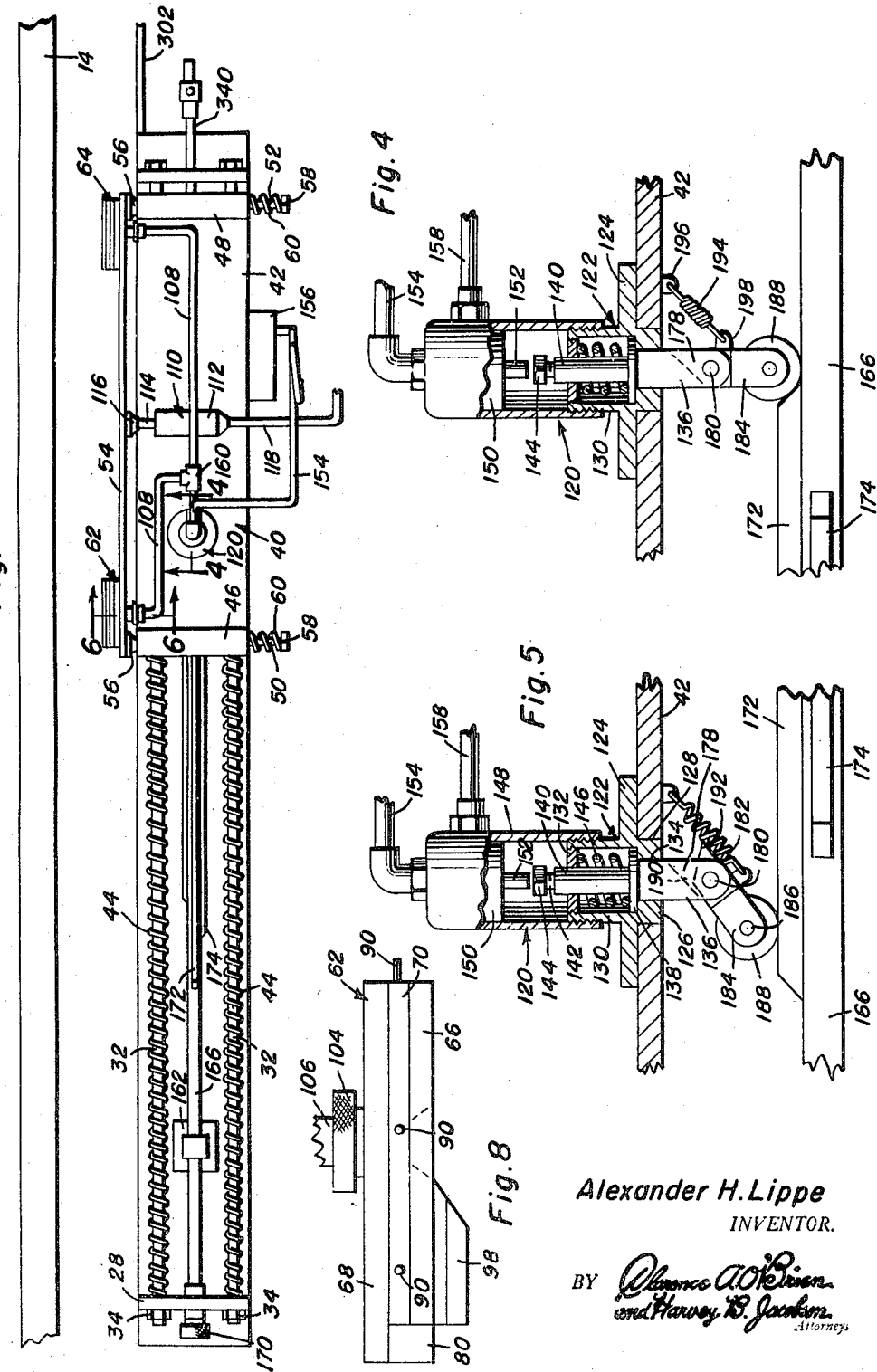

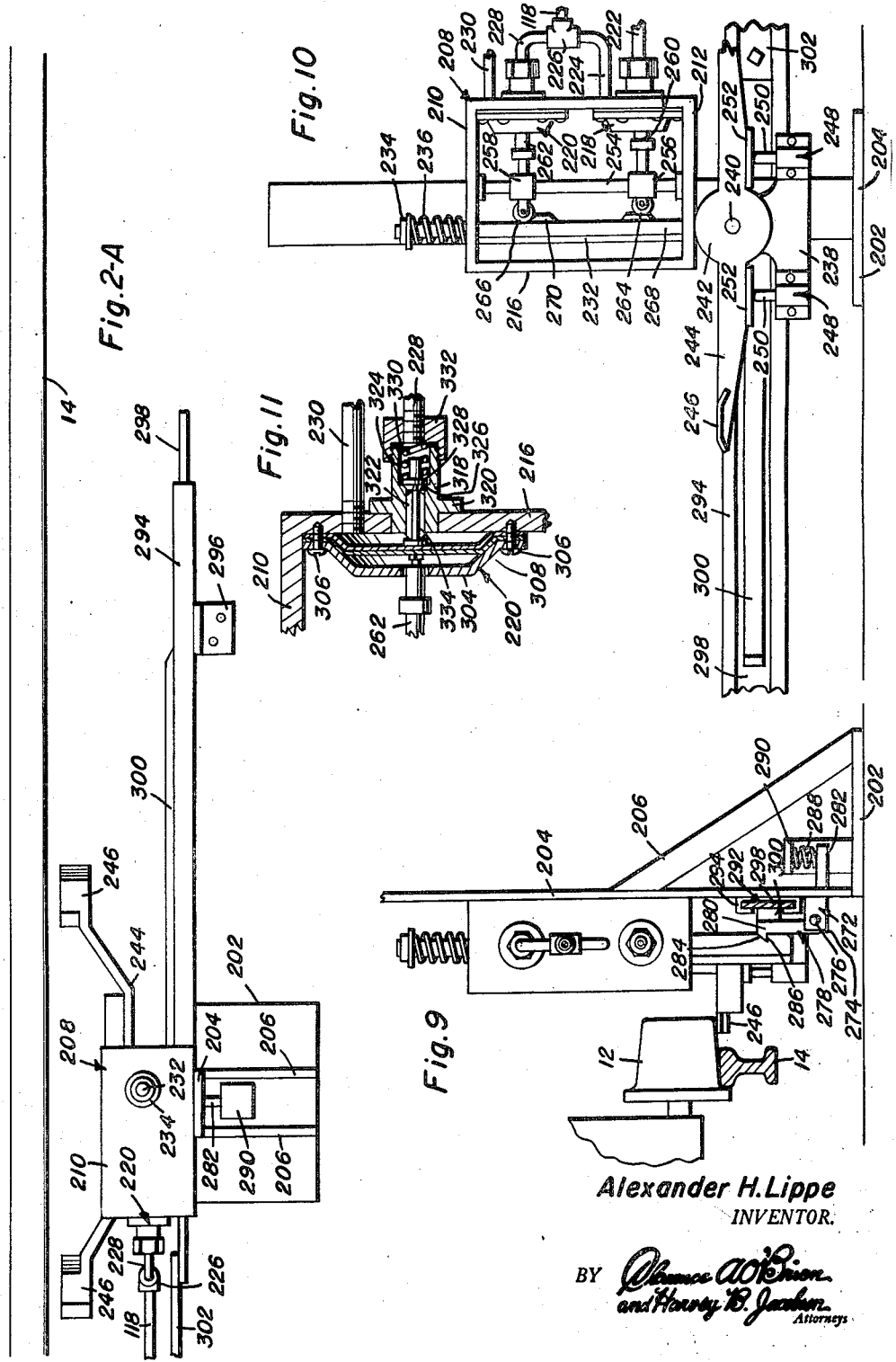

United States Patent Office 2,905,271
Patented Sept. 22, 1959

2,905,271

AUTOMATIC PRESSURE LUBRICATOR

Alexander H. Lippe, Sault Sainte Marie, Ontario, Canada

Application September 30, 1957, Serial No. 687,114

10 Claims. (Cl. 184—15)

This invention relates in general to new and useful improvements in pressure lubricators, and more specifically to an automatic pressure lubricator for car wheels.

There are numerous operations involving cars wherein the wheels of the cars must be frequently lubricated. This is true of mining cars and the like. Also, pallets or cars used in sintering plants are subject to heat with the result that it is necessary to frequently lubricate the wheels thereof.

It is therefore the primary object of this invention to provide a lubricator which is so constructed whereby it will automatically lubricate wheels of a car as it passes the lubricator without the necessity of stopping the car for the purpose of the lubrication.

Another object of this invention is to provide an automatic pressure lubricator, the pressure lubricator being provided with special fittings which will engage the lubricating fittings of car wheels so that there is an interconnection between the pressure fittings of the lubricator and the wheel fittings so that wheels of a car may be pressure lubricated during movement of such car.

Another object of this invention is to provide an improved automatic pressure lubricator for car wheels, the pressure lubricator including a carriage which is mounted on a trackway for movement with a car as it moves along a track adjacent the trackway, the car wheels being provided with lubricating fittings and the carriage carrying at least one lubricating head for engagement with a car wheel lubricating fitting, and there being provided means for engaging the lubricating head with the car wheel lubricating fitting so that as the lubricating head and carriage moves along together with the car wheel, the car wheel is automatically pressure lubricated.

Still another object of this invention is to provide an improved lubricator for car wheels, the lubricator being of an extremely simple construction and formed of relatively inexpensive materials and at the same time being of such a construction where the operation thereof is automatic.

A further object of this invention is to provide an automatic pressure lubricator for car wheels, the pressure lubricator including a carriage having at least one lubricating head for engagement with a lubricating fitting of a car wheel, and there being operating means for moving the lubricating head from an inoperative position into a wheel engaging position, the means for operating the lubricating head being disposed remote from the carriage and being controlled by the position of a car distant from the car whose wheels are to be lubricated.

Another object of this invention is to provide an improved automatic pressure lubricator for car wheels, the pressure lubricator being so constructed whereby it will move with the car wheel to effect the lubrication thereof during the movement of the car, the pressure lubricator including a control valve for controlling the supplying of grease or other lubricant to the lubricating head, the control valve being actuated in response to movement of the carriage with a car whose wheels are being lubricated.

Still a further object of this invention is to provide an improved automatic pressure lubricator for car wheels, the pressure lubricator being so constructed whereby as a string of cars pass along a particular section of track, each of the cars has the grease fittings of the wheels thereof engaged by a lubricating head, the lubricating head moving along with the wheel to which it is connected and supplying to the grease fitting of the wheel during its movement, and the lubricating head being automatically disengaged from the car wheel at the end of the travel of the lubricating head and being returned to an initial position for alignment and engagement with a wheel of the next car, the entire operation of the pressure lubricator being automatic.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figures 1 and 1-A are elevational views of the automatic pressure lubricator which is the subject of this invention and shows the pressure lubricator in operation, the carriage of the pressure lubricator being in a position for initial engagement with wheels of a car, which car wheels are being lubricated;

Figures 2 and 2-A are top plan views of the automatic pressure lubricator and shows the relation thereof with respect to one rail of a track on which the wheels of the car are to be lubricated run;

Figure 3 is an enlarged fragmentary sectional view at the left hand end of the automatic pressure lubricator, as viewed in Figure 1, and shows the general relationship between the carriage and a wheel of a car which is being lubricated;

Figure 4 is an enlarged fragmentary sectional view taken substantially upon the plane indicated by the section line 4—4 of Figure 2 and shows the details of a control valve for controlling the flow of a lubricant to a lubricating head of the automatic pressure lubricator;

Figure 5 is an enlarged fragmentary sectional view similar to Figure 4 and shows the control means for the lubricant control valve during return movement of the carriage;

Figure 6 is an enlarged fragmentary transverse sectional view taken substantially upon the plane indicated by the section line 6—6 of Figure 2 and shows the relationship between a car wheel grease fitting and the lubricating head immediately prior to the final positioning of the lubricating head with respect to the grease fitting;

Figure 7 is an enlarged fragmentary elevational view showing the specific details of the lubricating head and the support in which the lubricating head is mounted for limited movement;

Figure 8 is an enlarged fragmentary plan view of the lubricating head and the support therefor;

Figure 9 is an enlarged fragmentary transverse sectional view taken through the automattic pressure lubricator intermediate the actuating means for positioning the lubricating heads and the carriage and shows the actuating means in an operating position;

Figure 10 is an enlarged fragmentary elevational view from the inner side of the actuating means and shows the details of control valves thereof and a balance beam for actuating the same;

Figure 11 is an enlarged fragmentary sectional view taken through one of the control valves of the actuating means and shows the details thereof in a closed position; and Figure 12 is a fragmentary enlarged sectional view similar to Figure 11 and shows the details of the valve of Figure 11 in an open position.

Referring now to the drawings in detail, it will be seen that there is illustrated in Figures 1 and 1–A a plurality of individual cars 10 which are supported by wheels 12 which are to be lubricated. The cars 10 may be of any construction and therefore shown only diagrammatically. The wheels 12 engage rails 14 of a track, only one of the rails 14 being illustrated.

As is best shown in Figure 3, each of the wheels 12 includes a relatively wide rail engaging surface 16 and a flange 18. The rail engaging surface 16 is of a width so that the wheel 12 extends outwardly of the rail 14 on which it is positioned.

Referring now to Figure 6 in particular, it will be seen that each of the wheels 12 is provided in the outer end thereof with an internally threaded bore 20 in which there is threadedly engaged a grease fitting adapter 22. Carried by the outer end of the grease fitting adapter 22 is a conventional type of grease fitting 24.

Disposed alongside the rail 14 is an elongated base 26. The base 26 is provided at opposite ends thereof with angle brackets 28 and 30. Extending between the angle brackets 28 and 30 and supported thereby are transversely spaced track elements 32 of a trackway. The track elements 32 are in the form of elongated rods which have their opposite ends anchored with respect to the angle brackets 28 and 30 by means of nuts 34.

Slidably mounted on the track elements 32 are sleeve portions 36 and 38 of a carriage 40. The carriage 40 is primarily in the form of a flat plate 42 which has secured to the underside thereof at opposite ends the sleeves 36 and 38, there being two sleeves 36 and two sleeves 38, the sleeves in each pair being transversely spaced so as to receive the track elements 32. Normally the carriage 40 is retained at the right end of the track elements 32 adjacent the angle bracket 30 by means of coil springs 44 mounted on the track elements 32, as is best shown in Figures 1 and 2. The coil springs 44 have the left ends thereof engaged with the angle bracket 28 and the right ends thereof engaged with the sleeve 36.

Referring now to Figure 2 in particular, it will be seen that disposed at opposite ends of the plate 42 in overlying relation thereto are transversely extending sleeves 46 and 48. The sleeves 46 and 48 have extending therethrough shafts 50 and 52, respectively, which in turn support a support bar 54 disposed intermediate the carriage 40 and the rail 14. Each of the shafts 50 and 52 includes a first head 56 which is secured to the support bar and a second head 58 which is disposed outwardly of its respective sleeve 46 or 48. Disposed intermediate the heads 58 and the sleeves 46 and 48 are coil springs 60 which are carried by the shafts 52. The coil springs 60 resiliently resist the movement of the support bar 54 towards the rail 14.

Extending upwardly from opposite ends of the support bar 54 are hollow supports 62 and 64. Inasmuch as these supports are identical, only the support 62 will be described in more detail hereinafter.

As is best shown in Figures 6 and 7, the support 62 is formed of two outer plates 66 and 68 and an inner plate 70. The plates 66, 68 and 70 are generally rectangular in outline and the plate 68 is provided with a relatively small central opening 72. The intermediate plate 70 is provided with a large opening 74, which opening opens through the left hand end thereof, as viewed in Figure 7. The plate 66 is provided with a relatively large rectangular opening 76 which also opens through the left hand end thereof, as is viewed in Figure 7. The plates 66, 68 and 70 are connected together by a plurality of fasteners 78 which are preferably in the form of rivets or bolts.

It is to be noted that the plate 68 is longer than the plates 66 and 70 and extends to the lengths of the plates 66 and 70. Secured to the upper portion of the plate 68 which extends beyond the plates 66 and 70 is a bar 80. The bar 80 is secured in place by means of fasteners 82. The bar 80 serves to close the ends of the openings 74 and 76.

Positioned within the support 62 is a lubricating head which is referred to in general by the reference numeral 84. The lubricating head 84 includes a body portion 86 which is flat and rectangular in outline and of an extent less than the opening 74 but greater than the opening 76 so that it is retained between the plates 66 and 68 and within the confines of the plate 70. The body portion 86 is retained in a centered position relative to the support 62 by means of a plurality of retainers 88. The arrangement of the retainers 88 is best shown in Figure 7. Each of the retainers 88 includes an elongated rod 90 which extends outwardly through the plate 70 and which is provided at the inner end thereof with an enlarged head 92 which engages an edge of the body portion 86. Disposed intermediate the head 92 and the plate 70 on each of the pins 90 is a coil spring 94. Each coil spring 94 reacts to retain the body portion 86 in a centered position.

Projecting out through the opening 76 and integrally connected to the body portion 86 is a guideway 96 which includes a flared entrance opening 98. The guideway 96 also includes a stop portion 100 for receiving the grease fitting adapter 22 and aligning it with the lubricating head 84.

Aligned with the stop portion 100 is an internally threaded bore 102 in the body portion 86. Threadedly engaged in the bore 102 is an adapter fitting 104 which carries a conventional type of lubricator fitting 106 of the pressure type. The lubricator fitting 106 is of the type which receives a portion of the grease fitting 24 and when it does receive the grease fitting 24, it automatically pumps grease into the grease fitting 24. Connected to the lubricator fitting 106 is a lubricator line 108.

In order to best explain the further components of the automatic pressure lubricator which is the subject of this invention, it is deemed advisable at this time to set forth the intended mode of operation. When a pair of wheels 12 of one of the cars 10 becomes aligned with the supports 62 and 64, it is desired that the supports 62 and 64 be moved towards the car wheels 12. At this time the grease fittings 24 and the adapter fittings 22 will engage the lubricating heads 84 of the supports 62 and 64 and a connection between the grease fittings 24 and the lubricating fitting 106 will result. At this time the carriage 40 will be moved along the track elements 32 in response to movement of the car wheels along their respective rails 14. As the carriage 40 moves along the track elements 32, it is desired that grease be pumped into the grease fittings 24 through the lubricator fittings 106.

In order to accomplish the movement of the supports 62 and 64 towards the rail 14 and car wheels 12 mounted thereon, there is provided an extensible fluid motor 116 which includes a cylinder 112 and a piston rod 114. The piston rod 114 is provided with an enlarged head 116 which is connected to an intermediate portion of the support rod 54. Connected to the cylinder 112 is a flexible fluid line 118 through which the flow of fluid under pressure to the fluid motor 110 is controlled by a valve to be described in more detail hereinafter.

Carried by the plate 42 is a lubricant control valve assembly which is referred to in general by the reference numeral 120. The lubricant control valve assembly 120 includes a base member 122 having a mounting flange 124 secured to the plate 42, there being provided a downwardly extending boss 126 which is received in a bore 128 in the plate 42. Extending upwardly from the mounting flange 124 is an externally threaded sleeve 130 whose upper end is closed by a guide 132.

The boss 126 is provided with a bore 134 through which there extends downwardly in guided relation a first link 136. The link 136 is provided at the upper end thereof with a plate 138 which is guidingly disposed in the sleeve 130. Extending upwardly from the plate 138 is an internally threaded extension 140 in which there is adjustably threaded a shank portion 142 of the tappet 144. The extension 140 is guidingly engaged with the guide 132. Extending between the collar 138 and the guide 132 and surrounding the extension 140 is a return spring 146 which normally retains the tappet 144 in a lowered position.

Threadedly engaged with the sleeve 130 in telescoped relation therewith is a larger sleeve 148. The sleeve 148 has mounted in the upper part thereof a control valve 150 which is operated by means of a plunger 152. The plunger 152 is aligned with the tappet 144 and is engaged thereby for movement to a valve opening position.

Connected to the upper part of the control valve 150 is a lubricant supply line 154 whose opposite end is connected to a lubricant supply 156 which is under pressure. The lubricant supply line 154 will be flexible to compensate for the relative movements between the carriage 40 and the supply 156. The control valve 150 also includes an outlet line 158 which has connected thereto a T-type fitting 160. Also connected to the fitting 160 are lubricant supply lines 108 from the pressure heads 84 carried by the supports 62 and 64.

Referring once again to Figure 1 in particular, it will be seen that there is carried by the base 26 intermediate the angle brackets 28 and 30 a pair of supports 162 and 164. The support 162 is disposed adjacent the angle bracket 28 whereas the support 164 is disposed adjacent to the angle bracket 30. Extending through the support 162 and terminating at the support 164 is a bar 166. The bar 166 has the opposite end thereof terminating at the angle bracket 28 and is retained in place by a nut member 170. Disposed intermediate the ends of the bar 166 and projecting upwardly therefrom is a cam 172. Also projecting from the bar 166 in the vicinity of the cam 172 is a plurality of other circumferentially spaced cams 174 and 176. It is to be understood that the bar 166 is rotatable within the supports 162 and 164 and the angle bracket 28 and is positioned by the nut 170 so that the desired cam may be disposed uppermost. It is also to be noted that the cams 172, 174 and 176 vary in length. It is the length of the cam which is disposed uppermost which controls the amount of time which lubricant is being pumped through the control valve 150.

Referring once again to Figure 5 in particular, it will be seen that the link 136 is provided with a lower portion 178 of a reduced thickness. The lower end of the lower portion 178 is provided with a pivot pin 180 which pivotally connects thereto an upper portion 182 of a link 184. The upper portion 182, like the power portion 178, is of a reduced thickness. The lower end of the link 184 is provided with an axle 186 which in turn supports a follower 188 of the roller type. The follower 188 is so positioned whereby it is aligned with the cam 172.

The formation of the reduced lower portion 178 of the link 136 results in a shoulder 190. The reduced upper portion 182 terminates in an upper edge 192 which corresponds to the shoulder 190. Thus when the links 136 and 184 are disposed in alignment, as is shown in Figure 4, the upper end 192 is engaged with the shoulder 190 so that swinging the link 184 in a counterclockwise direction about the pivot pin 180 past the position illustrated in Figure 4 is prevented. The link 184 is resiliently retained in this position by means of a spring 194 which extends between an ear 196 on the plate 42 and an ear 198 on the link 184.

As the carriage 40 moves to the left during a lubricating operation, the follower 188 will ride up on the cam 172 and thus cause upward movement of the tappet 144 to urge the plunger 152 upwardly and move the valve 150 to an open position whereby lubricant under pressure will be supplied to the lubricating head 84. The control valve 150 will remain open as long as the follower 188 is engaged on the cam 172. Before the carriage 40 reaches the end of its travel, the follower 188 will roll off of the left hand end of the cam 172 and the grease dispensing operation will stop. As the carriage 40 reverses its direction, the follower 188 will ride up on the left end of the cam 172. However, at this time, the link 184 will pivot with respect to the link 136 to the position illustrated in Figure 5 due to the resistance against upward movement of the link 136 by the spring 146. Since the link 184 is disposed at an angle to the link 136, upward movement of the link 136 is not necessary and therefore the valve 150 is not opened during the return movement of the carriage 40. Of course, at this time, the lubricating heads 84 are not engaged with the grease fittings 24 of car wheels 12. Referring now to Figure 1-A in particular, it will be seen that disposed remote from the base 26 is a support surface 200 on which there is engaged a base flange 202 of a standard 204. The standard 204 is braced relative to the base flange 202 by suitable angle brackets 206. Carried by the inner surface of the standard 204 is a rectangular frame which is referred to in general by the reference numeral 208. The frame 208 includes a top wall 210, a bottom wall 212, a left side wall 214 and a right side wall 216. Carried by the left wall 214 and projecting inwardly into the interior of the frame 208 is a pair of valves 218 and 220. The valve 218 has connected thereto a main fluid supply line 222. The fluid supply line 222 has the opposite end thereof connected to a pressurized source of fluid. Also extending from the valve 218 is an outlet line 224 which is connected to a T-fitting 226. The T-fitting 226 has connected thereto a supply line 118 which is in the form of a flexible hose and a supply line 228 for the valve 220. Also connected to the valve 220 is an exhaust line 230.

Extending upwardly through the frame 208 and journaled in the walls 210 and 212 is a vertically disposed actuating rod 232. The actuating rod 232 is disposed both above and below the frame 208 and is positioned adjacent the wall 216. The upper end of the actuating rod 232 is provided with a stop collar 234 and there is carried by the upper portion of the actuating rod 232 a coil spring 236 which normally urges it to an uppermost position. The coil spring 236 extends between the top wall 210 of the frame 208 and the stop collar 234.

Carried by the lower end of the actuating rod 232 is a bracket 238 which is best shown in Figure 10. The bracket 238 has carried by the upper part thereof a balance shaft 240 on which there is pivotally mounted a hub portion 242 of a balance beam 244. The balance beam 244 is provided at opposite ends thereof with inwardly projecting wheel engageable plates 246 which, as is best shown in Figure 9, are positioned closely adjacent the rail 14 by engagement by the car wheels.

In order that the balance beam 244 may be normally retained in a horizontal position, there is carried by the bracket 238 a pair of return units 248 each of which includes a resiliently mounted stop member 250. The central portions of the balance beam 244 are provided with plates 252 which engage the stop members 250.

It is to be understood that when a car wheel engages one of the wheel engageable plates 246, the balance beam 244 will be pivoted about the balance shaft 240 and once the car wheel 12 has moved out of engagement with the wheel engageable plate 246, the balance beam 244 will be returned to its horizontal position by the assemblies 248. However, when the wheel engageable plates 246 are simultaneously engaged by a pair of car wheels 12, both ends of the balance beam 244 will move downwardly and as a result the balance shaft 240 will move downwardly thus moving the bracket 238 downwardly and finally resulting in the downward movement of the actuating rod 232, the actuating rod 232 being shown in its lowered position in Figures 9 and 10.

Referring once again to Figure 10 in particular, it will be seen that extending between the walls 210 and 212 of the frame 208 is a vertical support 254 which is provided with a lower horizontal guide 256 and an upper horizontal guide 258. The lower horizontal guide 256 has slidably disposed therein a horizontally positioned control shaft 260 for the valve 218. A similar control shaft 262 for the valve 220 is disposed in the guide 258. The end of the control shaft 260 remote from the valve 218 is provided with a follower 264. A similar follower 266 is carried by the control shaft 262. Carried by the actuating rod 232 for engagement with the followers 264 and 266 are cams 268 and 270, respectively. The cam 270 is so positioned whereby the valve 220 is in a normally opened position and the valve 218 is in a normally closed position. However, when the actuating rod 232 moves downwardly, the valve 218 is moved to an open position and the valve 220 is moved to a closed position.

Inasmuch as the valves 218 and 220 control the positioning of the lubricating heads 84, it is to be understood that it is desired that the position of the valves 218 and 220 remain constant for such period of time as the lubricating operation is in process. Inasmuch as the car wheels 12 are only momentarily engaged with the wheel engageable plates 242, it is necessary that there be provided a suitable latch assembly for retaining the actuating rod 232 in a lowered position after the wheel engageable plates are no longer engaged by the wheels 12. The latch assembly is referred to in general by the reference numeral 272 and is carried by the lower part of the standard 202. The latch assembly 272 includes a mounting bracket 274 carrying a pivot pin 276. Pivotally mounted on the pivot pin 276 is an L-shaped latch member 278 which includes a vertical arm 280 and a horizontal arm 282, the horizontal arm 282 extending through the standard 202. The upper end of the vertical arm 280 is provided with a projecting ear 284 which is received in a notch 286 formed in the lower part of the actuating rod 232.

The latch 278 is normally retained in an inoperative position by means of a spring 288 which engages the horizontal leg 282. This spring is carried by a spring retainer 290 extending upwardly from the base flange 200.

In order that the latch 278 may be moved into engagement with the actuating rod 232 and retained in that position, there is provided a latch retainer which is referred to in general by the reference numeral 292. The latch retainer 292 includes an elongated guideway 294 which is supported by the standard 204 at one end and at the opposite end by an angle bracket 296. Slidably disposed in the guideway 294 is a bar 298 which in turn carries a wedge bar 300. Connected to the bar 298 is a connecting rod 302 whose opposite end is connected to the carriage 40.

Referring now to Figure 11, it will be seen that there is illustrated the details of the valve 220. The valve 220 includes a housing 304 which is connected to the wall 216 by means of fasteners 306 so that the wall 216 forms a part of the valve 220. Clamped between the housing 304 and the wall 216 is a diaphragm 308. Also, carried by the wall 216 is a valve body 318 which includes a mounting flange 320. The valve body has a fluid passage 322 therethrough. The outer part of the fluid passage 322 is enlarged as at 324 and there is provided a valve seat 326. Normally engaged with the valve seat 326 is a valve member 328 which is urged into a seated position by means of a coil spring 330. Connected to the valve body 318 by means of a fitting 332 is an inlet line 228.

The valve member 328 has engaged therewith an actuator 334 which is cruciform in cross-section and which is slidably disposed in the fluid passage 322. Aligned with the actuator 334 is an adjustable tappet 336 of the control shaft 262. Also carried by the wall 216 and opening into the interior of the housing 304 is the exhaust line 230.

Inasmuch as the valve 218 is identical with the valve 220, with the exception of the connection of the lines thereto, the valve 218 will not be described in detail.

*Operation*

The balance beam 244 is so positioned whereby as car wheels 12 of one of the cars 10 engage the wheel engageable plates 246 at opposite ends of the balance beam 244, the car wheels of another of the cars 10 are approaching alignment with the supports 62 and 64. When the car wheels 12 engage the wheel engageable plates 242 and depress the balance beam 244, the actuating rod 232 moves downwardly and moves the valve 220 from an open position to a closed position and the valve 218 from a closed position to an open position. At this time fluid under pressure is supplied to the fluid motor 110 and the supports 62 and 64 are moved towards the rails 14. As the car wheels of the car 10 to be lubricated move further along the rail 14, the adapter fittings 22 thereof engage the guides 96 of the lubricating heads 84 and proceed to position the lubricating heads 84 with respect to the grease fittings 24 so that when the adapter fittings 22 engage the stop portions 100 of the guides 96, the grease fittings 24 are aligned with the lubricating fittings 106 and further movement of the supports 62 and 64 towards the rail 14 will result in interlocking engagement of the grease fittings 24 and lubricating fittings 106. At this time the carriage 40 is so interlocked with the car whose wheels 12 are being lubricated, that it moves along the track elements 32 with the car 10. As the carriage 40 proceeds to move with the car whose wheels 12 are being lubricated, the latch assembly 272 is actuated to interlock with the actuating rod 232 and to retain the actuating rod 232 in its lowered position so that when the wheel engageable plates 246 are no longer engaged by wheels 12, the actuating rod 232 will not return to its original position by the spring 236.

As was previously described, as the carriage 40 moves along the track elements 32, the control valve 150 is opened to supply a lubricant under pressure to the lubricating heads 84.

As the carriage 40 approaches the end of its travel, the wedge bar 300 will move out of engagement with the latch 278 and the latch 278 will be free to momentarily move to a released position. At this time the actuating rod 232 will be free to move upwardly due to the urgence of the coil spring 236. When the actuating rod 232 moves upwardly, the valve 218 is closed and the valve 220 is opened. When the valve 220 is opened, the fluid motor 110 is vented to the air and the coil springs 60 return the supports 62 and 64 to their retracted positions. This results in the disengagement of the lubricating heads 84 from the adapter fittings 22 and the grease fittings 24. The carriage 40, no longer being connected to the car wheels 12, is then urged to the right by the coil springs 32. Carried by the angle support or bracket 30 and connected to the carriage 40 is a damper 340 of the air pressure type. This damper 340 retards the return movement of the carriage 40 so that it does not reach the end of its travel too fast and then be damaged thereby. Once the carriage 40 is returned to its initial position, the automatic pressure lubricator is ready to again start the aforementioned operation.

While various types of controls have been specifically described and illustrated, it is to be understood that the controls for actuating the various components of the present invention may be varied as desired depending upon the conditions and the sources of power which may be available.

The foregoing is considered as illustrative only of the principles of the invention. Further, since numerous modifications and changes will readily occur to those skilled in the art, it is not desired to limit the invention

What is claimed as new is as follows:

1. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said control means including a fixed cam, and a follower on said lubricant control valve for actuating said control valve, said follower being engaged with said cam in response to movement of said carriage.

2. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said control means including a fixed cam, and a follower on said lubricant control valve for actuating said control valve, said follower being engaged with said cam in response to movement of said carriage, linkage connecting said follower to said lubricant control valve, said linkage including a pair of links, a pivot pin pivotally connecting together said links, a stop member on one of said links engaged by the other of said links limiting pivoting of said link to one direction only, the direction of pivoting being the same as the direction of initial movement of said carriage whereby said lubricant control valve is actuated in one direction of movement of said carriage only.

3. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, a hollow support on said carriage, said lubricating head being mounted in said support for limited vertical and longitudinal movement, a plurality of springs between said support and said lubricating head for normally centering said lubricating head, said springs lying in a common plane and being spaced about the periphery of said lubricating head.

4. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, a hollow support on said carriage, said lubricating head being mounted in said support for limited vertical and longitudinal movement, a plurality of springs between said support and said lubricating head for normally centering said lubricating head, said springs lying in a common plane and being spaced about the periphery of said lubricating head, said lubricating head including a guide portion for engaging a car wheel and aligning said lubricating head therewith.

5. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said actuating means including a latch, a latch retainer connected to said carriage for retaining said latch in a latched position during a predetermined portion of the movement of said carriage.

6. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said actuating means including an actuating rod, means mounting said actuating rod for movement to operate said actuating means, a balance beam, a balance shaft carried by said actuating rod, said balance beam being pivotally mounted on said balance shaft, wheel engageable plates on opposite ends of said balance beam for simultaneous engagement by a pair of spaced car wheels to move said actuating rod to an actuating means operating position.

7. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said actuating means including an actuating rod, means mounting said actuating rod for movement to operate said actuating means, a balance beam, a balance shaft carried by said actuating rod, said balance beam being pivotally mounted on said balance shaft, wheel engageable plates on opposite ends of said balance beam for simultaneous engagement by a pair of spaced car wheels to move said actuating rod to an actuating means operating position, a latch engageable with said actuating rod to retain said actuating rod in a lowered position, a latch retainer connected to said carriage for retaining said latch in a latched position during a predetermined portion of the movement of said carriage.

8. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said positioning means being in the form of a fluid motor of the extensible type and a pressurized fluid source, said actuating means including a fluid control valve disposed intermediate said pressurized fluid source and said fluid motor, an actuating rod, means mounting said actuating rod for movement to operate said fluid control valve, a balance beam, a balance shaft carried by said actuating rod, said balance beam being pivotally mounted on said balance shaft, wheel engageable plates on opposite ends on said balance beam for simultaneous engagement by a pair of spaced car wheels to move said actuating rod to an actuating means operating position.

9. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said positioning means being in the form of a fluid motor of the extensible type and a pressurized fluid source, said actuating means including a fluid control valve disposed intermediate said pressurized fluid source and said fluid motor, an actuating rod, means mounting said actuating rod for movement to operate said fluid control valve, a balance beam, a balance shaft carried by said actuating rod, said balance beam being pivotally mounted on said balance shaft, wheel engageable plates on opposite ends of said balance beam for simultaneous engagement by a pair of spaced car wheels to move said actuating rod to an actuating means operating position, a latch engageable with said actuating rod to retain said actuating rod in a lowered position, a latch retainer connected to said carriage for retaining said latch in a latched position during a predetermined portion of the movement of said carriage.

10. An automatic lubricator for car wheels comprising a trackway, a carriage mounted on said trackway for movement therealong, at least one lubricating head, a lubricant source, a lubricant line connecting said lubricating head to said lubricant source, a lubricant control valve in said lubricant line, control means for operating said lubricant control valve in response to movement of said carriage, support means mounting said lubricating head on said carriage for movement with said carriage and for movement normal to the direction of said carriage, positioning means carried by said carriage for projecting said lubricating head into a wheel engaging position, actuating means connected to said positioning means to actuate said positioning means in response to alignment of a car wheel with said lubricating head, said control means including a fixed cam, and a follower on said lubricant control valve for actuating said control valve, said follower being engaged with said cam in response to movement of said carriage, return springs engaged with said carriage for automatically returning said carriage to an initial position.

References Cited in the file of this patent

UNITED STATES PATENTS

| | | |
|---|---|---|
| 2,502,659 | Livingston | Apr. 4, 1950 |
| 2,696,277 | Schweisthal | Dec. 7, 1954 |
| 2,754,932 | Clements | July 17, 1956 |

FOREIGN PATENTS

| | | |
|---|---|---|
| 357,385 | Great Britain | Sept. 24, 1931 |